United States Patent [19]
Danot et al.

[11] Patent Number: 6,071,402
[45] Date of Patent: Jun. 6, 2000

[54] HYDRODEFINING AND HYDROCRACKING CATALYST COMPRISING A MIXED SULPHIDE COMPRISING SULPHUR, AT LEAST ONE GROUP VB ELEMENT AND AT LEAST ONE GROUP VIB ELEMENT

[75] Inventors: Michel Danot, Nantes, France; Nabil Allali, Meknes, Morocco; Valerie Gaborit, Savenay, France; Christophe Geantet, Miribel, France; Pavel Afanassiev, Decines, France; Samuel Mignard, Chatou, France; Slavik Kasztelan, Rueil Malmaison, France

[73] Assignee: Institut Francais du Petrole, Rueil Malmaison Cedex, France

[21] Appl. No.: 08/998,999

[22] Filed: Dec. 29, 1997

[30] Foreign Application Priority Data

Dec. 27, 1996 [FR] France ................................. 96 16091
Mar. 3, 1997 [FR] France ................................. 97 02595

[51] Int. Cl.⁷ ......................... C10G 47/02; C10G 45/60; B01J 27/047; B01J 27/051
[52] U.S. Cl. ......................... 208/112; 208/213; 208/214; 208/215; 208/216 R; 208/217; 208/251 H; 208/254 H; 208/142; 208/143; 208/144; 208/145; 502/219; 502/220; 502/221
[58] Field of Search .................................. 502/219, 220, 502/221; 208/112, 213, 214, 215, 216 R, 217, 251 H, 254 H, 142, 143, 144, 145

[56] References Cited

U.S. PATENT DOCUMENTS

| | | | |
|---|---|---|---|
| 4,181,602 | 1/1980 | Quick et al. | 208/216 PP |
| 4,320,030 | 3/1982 | Happel et al. | 518/714 |
| 4,491,639 | 1/1985 | Happel et al. | 502/219 |
| 4,994,498 | 2/1991 | Kinkade | 518/714 |

FOREIGN PATENT DOCUMENTS

| | | |
|---|---|---|
| 0 181 082 | 5/1986 | European Pat. Off. . |
| 0 216 472 | 4/1987 | European Pat. Off. . |
| 2 036 582 | 7/1980 | United Kingdom . |
| 90/05587 | 5/1990 | WIPO . |

*Primary Examiner*—Elizabeth D. Wood
*Attorney, Agent, or Firm*—Millen, White, Zelano & Branigan, P.C.

[57] ABSTRACT

The present invention concerns a hydrorefining and/or hydrocracking catalyst for hydrocarbon feeds, comprising at least one mixed sulphide comprising sulphur, at least one group VB element, preferably niobium, and at least one group VIB element, preferably molybdenum or tungsten, more preferably molybdenum, optionally combined with a support and/or at least one group VIIA metal and/or at least one group VIII metal and/or an element selected from the group formed by S, P, B, Si.

39 Claims, No Drawings

HYDRODEFINING AND HYDROCRACKING CATALYST COMPRISING A MIXED SULPHIDE COMPRISING SULPHUR, AT LEAST ONE GROUP VB ELEMENT AND AT LEAST ONE GROUP VIB ELEMENT

FIELD OF THE INVENTION

The present invention concerns a catalyst for hydrorefining and/or hydrocracking of hydrocarbon feeds, the catalyst comprising at least one mixed sulphide comprising sulphur, at least one element from group VB of the periodic table ("Handbook of Chemistry and Physics, 76$^{th}$ edition, 1995–1996, inside front cover) (group 5 in the new notation of the periodic table), preferably niobium, and at least one element from group VIB of that periodic table (group 6), preferably molybdenum or tungsten, more preferably molybdenum, optionally combined with a support and/or at least one metal from group VIB of that periodic table (group 6) and/or at least one metal from group VIII (groups 8, 9 and 10) of that periodic table, optionally at least one element selected from P, B and Si, and optionally at least one element from group VIIA of that periodic table (group 17), preferably fluorine.

The present invention also concerns processes for the preparation of the catalyst, also its use for hydrotreatment of hydrocarbon feeds such as petroleum cuts, cuts originating from coal including reactions such as hydrogenation, hydrodenitrogenation, hydrodeoxygenation, hydrodesulphuration, hydrocracking of hydrocarbon feeds containing aromatic compounds and/or olefinic compounds and/or naphthenic compounds and/or paraffinic compounds, the feeds possibly containing metals and/or nitrogen and/or oxygen and/or sulphur.

BACKGROUND OF THE INVENTION

Hydrotreatment of hydrocarbon feeds such as sulphur-containing petroleum cuts is becoming more and more important in refining due to the increasing necessity of reducing the quantity of sulphur in petroleum cuts and to convert heavy fractions to lighter fractions which can be upgraded to fuels. This results partly from an increasing demand for fuels which necessitates conversion of imported crude oils which are becoming poorer in hydrogen and richer in heavy fractions and heteroatoms, among them nitrogen and sulphur, and partly due to the regulations imposed by various countries on commercial fuels. This upgrading implies a relatively large reduction in the molecular weight of the heavy constituents which can be achieved, for example, by means of cracking reactions.

Current catalytic hydrorefining processes use catalysts which can promote the principal reactions used to upgrade heavy cuts, in particular aromatic ring hydrogenation (HAR), hydrodesulphuration (HDS), hydrodenitrogenation (HDN) and other hydroeliminations. Hydrorefining is used to treat feeds such as gasolines, gas oils, vacuum gas oils, and atmospheric or vacuum residues, deasphalted or otherwise. As an example, it is recommended for pre-treating feeds from catalytic cracking and hydrocracking processes. At least one hydrorefining step is normally integrated into each of the known flow sheets for upgrading heavy petroleum cuts. The influence of this prior hydrotreatment on the overall yield and service life of the cracking catalyst and/or hydrocracking catalyst is greater if hydrotreatment catalysts are used which are more active as regards hydrodenitrogenation, hydrodesulphuration and hydrogenation.

The field of the present invention, which is summarised above, is well known to the skilled person. A detailed analysis on this subject can be found in "Oil and Gas Journal, 16$^{th}$ February 1987, pp. 55 to 66, by Van Kessel et al.

Simple sulphides of group VB or group VIB elements have been described as constituents of hydrorefining or hydroconversion catalysts for hydrocarbon feeds, such as niobium trisulphide described in U.S. Pat. No. 5,294,333. Group VB metals such as niobium are known to be very difficult to sulphurate and conventional sulphuration methods do not generally result in the formation of mixed sulphides but only in simple sulphides or mixtures of simple sulphides. Thus only mixtures of simple sulphides comprising at least one group VB element and one group VIB element have been able to be tested as constituents of hydrorefining or hydroconversion catalysts for hydrocarbon feeds, such as in U.S. Pat. No. 4,910,181 or U.S. Pat. No. 5,272,994.

SUMMARY OF THE INVENTION

The invention thus concerns a hydrorefining and/or hydrocracking catalyst for hydrocarbon feeds, characterized in that it comprises at least one mixed sulphide comprising sulphur, at least one element from group VB of the periodic table, such as tantalum, niobium or vanadium, preferably niobium, and at least one element from group VIB of that periodic table, such as chromium, molybdenum or tungsten, preferably molybdenum or tungsten, more preferably molybdenum, optionally a group VIII element, optionally a support, preferably a generally porous matrix such as alumina, optionally an element selected from the group formed by P, B and Si, and optionally a group VIIA element, preferably fluorine.

The catalyst has an activity for hydrogenation of aromatic hydrocarbons, for hydrodesulphuration, for hydrodenitrogenation and for hydrocracking which is higher than known prior art catalytic formulae based on simple sulphides. Without wishing to be committed to a particular theory, it appears that this particularly high activity in the catalysts of the present invention is due to the particular properties of mixed sulphides comprising sulphur, at least one group VB element and at least one group VIB element. The presence of such a mixed sulphide also improves the hydrogenating, hydrodesulphurising, hydrodenitrogenating and cracking properties with respect to a sulphide of a group VIB element, in particular a molybdenum or tungsten sulphide, normally used for hydrorefining reactions.

The mixed sulphide present in the catalyst of the present invention is characterized by the following approximate general formula:

$$A_xB_{i-x}S_y$$

where
x is a number in the range 0.001 to 0.999, preferably in the range 0.005 to 0.995, more preferably 0.05 to 0.95;
y is a number in the range 0.1 to 8, preferably in the range 0.1 to 6, more preferably 0.5 to 4;
A is a group VB element such as tantalum, niobium or vanadium, preferably niobium;
B is an element selected from group VIB such as chromium, molybdenum or tungsten, preferably molybdenum or tungsten, more preferably molybdenum.

The catalyst of the invention can be supported or in a massive form, i.e., not comprising a support.

One catalyst of the present invention is in a massive form and generally comprises, in % by weight with respect to the total catalyst mass:

0.01% to 100%, preferably 0.05% to 100%, more preferably 0.1% to 100%, of at least one mixed sulphide;

the catalyst possibly further containing:

0 to 99.99%, preferably 0 to 99.95%, more preferably 0 to 99.9%, of at least one group VIII metal;

0 to 20%, preferably 0 to 15%, of at least one element selected from the group formed by elements Si, P and B; and 0 to 15%, preferably 0 to 10%, of at least one element selected from group VIIA, preferably fluorine.

The supported catalyst of the present invention generally comprises, in % by weight with respect to the total catalyst mass:

0.5% to 99.9%, preferably 1% to 99.0%, more preferably 5% to 99%, of at least one support;

0.1% to 99.5%, preferably 0.5% to 99%, more preferably 1% to 90%, of at least one mixed sulphide;

the catalyst possibly further containing:

0 to 30%, preferably 0 to 25%, more preferably 0 to 20%, of at least one group VIII metal;

0 to 20%, preferably 0 to 15%, of at least one element selected from the group formed by elements Si, P and B; and 0 to 15%, preferably 0 to 10%, of at least one element selected from group VIIA, preferably fluorine.

A preferred supported catalyst of the present invention generally comprises, in % by weight with respect to the total catalyst mass:

0.5% to 99.5%, preferably 1% to 99%, more preferably 5% to 95%, and still more preferably 10% to 90%, of at least one support preferably selected from the group formed by matrices;

0.5% to 99.5%, preferably 1% to 99%, more preferably 5% to 90%, and still more preferably 10% to 90%, of at least one mixed sulphide;

the catalyst possibly further containing:

0 to 30%, preferably 0 to 25%, more preferably 0 to 20%, of at least one group VIII metal;

0 to 20%, preferably 0 to 15%, of at least one element selected from the group formed by elements Si, P and B; and 0 to 15%, preferably 0 to 10%, of at least one element selected from group VIIA, preferably F.

A further preferred supported catalyst of the present invention generally comprises, in % by weight with respect to the total catalyst mass:

1% to 99.9%, preferably 5% to 99.5%, more preferably 10% to 99%, of at least one matrix;

0.1% to 99%, preferably 0.5% to 95%, more preferably 1% to 90%, of at least one mixed sulphide of at least one group VB metal and at least one group VIB metal;

the catalyst possibly further containing:

0 to 30%, preferably 0 to 25%, more preferably 0 to 20%, of at least one group VIII metal;

0 to 20%, preferably 0 to 15%, of at least one element selected from the group formed by elements Si, P and B; and 0 to 15%, preferably 0 to 10%, of at least one element selected from group VIIA, preferably F.

The mixed sulphide is generally identified from an X ray diffraction diagram. It can also be identified from determining the metal-metal distance measured by an X ray absorption technique or Extended X ray Absorption Fine Structure (EXAFS). As an example, for a mixed sulphide of molybdenum and niobium, EXAFS identification determines the niobium-niobium distances or the niobium-molybdenum distances if the EXAFS analysis is carried out using the niobium K edge. It can also determine the molybdenum-molybdenum and molybdenum-niobium distances if the EXAFS analysis is carried out using the molybdenum K edge.

The X ray diffraction diagram was obtained using an INEL diffractometer with a curved multidetector using a conventional powder technique with the monochromatic K alpha 1 line of copper. From the position of the diffraction peaks represented by the angle 2 theta, the Bragg relationship is used to calculate the characteristic interreticular distances $d_{hkl}$ of the sample and the lattice parameters of the mixed phase a and c in Å (1 Å=1 Angstrom=$10^{-10}$ m). The lattice parameter "a" represents the average metal-metal distance between two neighbouring ions and is characteristic of the existence of a mixed phase. The structural type can also be determined by diffraction. Thus, for example, for a mixed sulphide of molybdenum and niobium, simple sulphides of Mo and Nb, $MoS_2$ and $NbS_2$, both exist in the form of two structural types, the hexagonal form 2s and the rhombohedral form 3s. For molybdenum-rich samples (x<0.5), the mixed phase tends to crystallise in the hexagonal type structure 2s and the lattice parameters vary linearly as a function of the proportion of niobium in the mixed phase as shown in Table 1. For niobium-rich samples (x≧0.5), the mixed phase tends to crystallise in the rhombohedral structure 3s and the lattice parameters also vary linearly as a function of the niobium composition as shown in Table 2.

The error in the measurement of delta ($d_{hkl}$) can be estimated as a function of the absolute error in the measurement of angle 2 theta, using the Bragg relationship. An absolute error delta(2theta) of ±0.05° is normally acceptable. The intensity $I_{rel}$ at each value of $d_{hkl}$ is measured from the surface area of the corresponding diffraction peak.

TABLE 1

| Phase | a (Å) | c (Å) |
| --- | --- | --- |
| $MoS_2$-2s | 3.16 | 12.29 |
| $Nb_{0.2}Mo_{0.8}S_2$ | 3.20 | 12.05 |
| $Nb_{0.3}Mo_{0.7}S_2$ | 3.22 | 12.02 |
| $Nb_{0.4}Mo_{0.6}S_2$ | 3.25 | 12.00 |
| $NbS_2$-2s | 3.31 | 11.89 |

TABLE 2

| Phase | a (Å) | c (Å) |
| --- | --- | --- |
| $MoS_2$-3s | 3.16 | 18.37 |
| $Nb_{0.6}Mo_{0.4}S_2$ | 3.25 | 18.00 |
| $Nb_{0.7}Mo_{0.3}S_2$ | 3.27 | 17.98 |
| $Nb_{0.8}Mo_{0.2}S_2$ | 3.30 | 17.97 |
| $NbS_2$-3s | 3.33 | 17.81 |

Analysis of the X ray diffraction diagram in the form of the lattice parameter shown in Tables 1 and 2 leads to identification of the mixed niobium and molybdenum sulphide.

EXAFS analysis was carried out at the niobium K edge using synchrotron radiation between 18850 and 19800 eV measuring the absorbed intensity using a powder sample deposited on an adhesive strip. The absorption spectrum was analysed using an established procedure (F. W. Lyttle, D. E. Sayers and E. A. Stern, Physical Review B, vol 11, page 4825, 1975 and E. A. Stern, D. E. Sayers and F. W. Lyttle, Physical Review B, vol 11, page 4836) which allowed the interatomic distances to be determined.

Analysis of the X ray absorption spectrum led to a deduction of a radial distribution function. This radial distribution showed a first peak relative to the sulphur environment of the niobium the maximum position of which gave the niobium-sulphur distance or R1 as generally 2.45 Å to 2.48 Å, typical of $NbS_2$. On this radial distribution a second peak could be seen which corresponded to the second co-ordination sphere of the niobium composed of niobium or molybdenum atoms which could not be distinguished because of their very close atomic numbers, the position of the maximum of which gave the average metal-metal distance R2 (niobium-niobium or niobium-molybdenum), which value varies as a function of the composition of the mixed phase as shown in Table 3; that value is between the niobium-niobium distance in $NbS_2$ (3.33 Å) and the molybdenum-molybdenum distance in $MoS_2$ (3.16 Å), and is generally an average of 3.20 to 3.35 Å. This distance agrees with distances a determined by X ray diffraction and varies with the composition of the mixed phase. The distances reported in Table 3 are corrected for phase offset and can thus be compared with the data obtained by X ray diffraction. Determination of interatomic metal-metal distances by EXAFS is very precise since the absolute error estimated for the distance is ±0.02 Å.

TABLE 3

| Phase | R1 (Å) | R2 (Å) |
| --- | --- | --- |
| $Nb_{0.2}Mo_{0.8}S_2$ | 2.46 | 3.20 |
| $Nb_{0.3}Mo_{0.7}S_2$ | 2.45 | 3.22 |
| $Nb_{0.4}Mo_{0.6}S_2$ | 2.48 | 3.27 |
| $Nb_{0.6}Mo_{0.4}S_2$ | 2.47 | 3.28 |
| $Nb_{0.7}Mo_{0.3}S_2$ | 2.47 | 3.30 |
| $Nb_{0.8}Mo_{0.2}S_2$ | 2.48 | 3.31 |
| $NbS_2$ | 2.48 | 3.33 |

In general, the preparation process for the massive mixed sulphide comprised in the catalyst of the present invention comprises the following steps:
  a) forming a reaction mixture which comprises at least the following compounds: at least one source of a group VB element, at least one source of a group VIB element, optionally water, optionally at least one element selected from the group formed by group VIII elements, optionally at least one source of an element selected from the group formed by the elements: P, B and Si, and optionally an element selected from the halogens, i.e. group VIIA elements, preferably F;
  b) maintaining the mixture at a heating temperature which is generally over about 40° C., at a pressure which is at least equal to atmospheric pressure and in the presence of a sulphur compound until the mixed sulphide is obtained.

The mixture formed in step a) above can be produced simultaneously or successively, in any order, in the same physical space or separately.

Step b) has been shown to be very difficult in the majority of conventional sulphuration processes which are known to the skilled person. One preferred method of the invention consists of sulphurating a mixture, generally in the form of powdered solids, at a temperature in the range 40° C. to 700° C., preferably in the range 60° C. to 500° C., under autogenous pressure and in the presence of a gaseous sulphur compound such as $CS_2$, as is preferable. An autoclave is preferably used which is internally lined with a polymeric material, generally polytetrafluoroethylene, at a temperature of over 100° C. The heating period for the reaction mixture which is necessary for sulphuration depends on the composition of the reaction mixture and the reaction temperature. Such a method, described in the literature for the synthesis of a catalyst comprising niobium sulphide on alumina (Journal of Catalysis, vol. 156, pages 279–289 (1995)) and in European patent EP-A-0 440 516 for the synthesis of a binary sulphur compound, i.e., a simple sulphide comprising sulphur and another element, a transition metal or a rare earth, has been found to be suitable for the synthesis of the mixed sulphides of the present invention.

The invention also concerns an original process for synthesising a mixed sulphide with a particular composition, particularly important for producing the catalyst of the present invention when the catalyst comprises niobium and molybdenum. The process consists of using, for synthesising the mixed sulphide, niobium and molybdenum oxide with formula $Nb_2Mo_3O_{14}$ which is sulphided. $Nb_2Mo_3O_{14}$ is generally obtained by calcining a stoichiometric mixture of $MoO_3$ and $Nb_2O_5$ at a temperature which is in the range 200° C. to 1200° C., preferably in the range 300° C. to 1100° C., more preferably 350° C. to 1000° C. Sulphuration can be carried out using any method which is known to the skilled person. One conventional sulphuration process which is well known to the skilled person consists of heating the mixture of solids in a stream of a mixture of hydrogen and hydrogen sulphide or in a stream of a nitrogen and hydrogen sulphide mixture at a temperature which is in the range 150° C. to 800° C., preferably in the range 250° C. to 600° C., generally in a traversed bed reaction zone. A further sulphuration process is the sulphuration process described above, in an autoclave in the presence of a gaseous sulphur-containing compound such as $CS_2$.

The specific surface area of the mixed sulphide can be increased by intercalating lithium into the crystalline framework of the mixed sulphide synthesised by the processes described above, then de-intercalating the lithium. This operation exfoliates the mixed sulphide and increases the specific surface area. Lithium is generally intercalated by suspending the mixed sulphide in a solution of a light hydrocarbon such as hexane, containing an alkyllithium such as butyllithium (M. B. Dines, Material Research Bulletin, 10, 287 (1975)). It is also possible to intercalate up to one lithium atom per atom of the element selected from group VB or group VIB. The lithium is then de-intercalated generally by suspending the intercalated solid in water. The mixed sulphide is then recovered, for example by filtering and drying at 80° C.

The supported catalysts of the present invention can be prepared using any method which is known to the skilled person.

In general, processes for preparing the supported mixed sulphide catalyst of the present invention consist of preparing a composition comprising the mixed sulphide and the support. A number of these processes are described below. In general, it is possible to mechanically mix the matrix generally in the form of powder with any precursor of the mixed sulphide, then sulphurating, as will be described in more detail below. However, it is also possible to mix matrix precursors and the mixed sulphide, and either obtain a powder which is sulphurated or sulphurating the mixture of precursors and obtain a sulphurated powdered mixture, as is well known to the skilled person and which will be briefly described below. In all cases it is possible a priori to add the optional elements present in the supported catalyst of the invention at any stage of the preparation, using methods which are known to the skilled person.

One process for preparing a supported mixed sulphide comprised in the catalyst of the present invention comprises the following steps:

a) forming a reaction mixture which comprises at least the following compounds: at least one support selected from the group formed by matrices, at least one source of a group VB element, at least one source of a group VIB element, optionally water, optionally at least one element selected from the group formed by group VIII elements, optionally at least one source of an element selected from the group formed by the elements: P, B and Si, and optionally at least one source of an element selected from the halogens, i.e., group VIIA elements, preferably F;

b) maintaining the mixture at a heating temperature which is generally over about 40° C., in the presence of a sulphur compound until a solid containing at least the support and the mixed sulphide is obtained.

Step a) is preferably a support impregnation step.

Thus, for example in the preferred case when the group VB metal is niobium and the group VIB metal is molybdenum, the matrix, for example alumina, can be impregnated using ammonium heptamolybdate, then dried at 80° C., then impregnated with niobium oxalate, dried at 80° C., then sulphurated, for example and preferably using $CS_2$ in an autoclave under autogenous pressure, at 400° C. for 10 hours, for example.

It is also possible to mechanically mix the massive mixed sulphide synthesised using one of the methods described above with the support, then carrying out optional forming.

It is also possible to prepare an aqueous suspension of the exfoliated mixed sulphide phase by pouring a mixed sulphide phase intercalated with lithium into water then de-intercalating, and impregnating a support with this solution then carrying out optional forming.

It is also possible to mechanically mix the particular oxide phase $Nb_2Mo_3O_{14}$ described above with the support, then mechanically sulphurating the mixture which has optionally been formed. Sulphuration can be carried out by any method which is known to the skilled person, such as sulphuration using a gas phase comprising hydrogen sulphide and optionally nitrogen, or the sulphuration process described above, in an autoclave in the presence of a gaseous compound comprising sulphur, such as $CS_2$.

It is also possible to synthesise the catalyst from solids comprising at least one group VB element, and at least one group VIB element, the solids generally having been obtained from salts of group VB elements and salts of group VIB elements respectively, these syntheses being carried out simultaneously or successively, in any order, in the same physical space or separately, then mechanically mixing these solids with the support, and finally, after optional forming, sulphurating the mechanical mixture which has optionally been formed using a sulphur-containing compound so as to obtain the mixed sulphide. It is also possible to mix the powders comprising the source of the group VB element, the source of the group VIB element, optionally water, optionally the source of the element selected from P, B and Si, optionally the source of the group VIIA element and optionally the sulphur source, then impregnating the support.

Sulphuration of solids containing at least one group VB element in the oxide form has proved to be very difficult using the majority of conventional sulphuration processes known to the skilled person. One preferred process of the invention, described above consists of not calcining the catalyst and sulphurating with a gaseous compound containing sulphur such as $CS_2$ in an autoclave under pressure. Catalysts containing at least one group VB element supported on an alumina type matrix are known to be very difficult to sulphurate once the group VB element—alumina combination has been calcined at a temperature of over 200° C.

The mixture of powders comprising the source of the group VB element, the source of the group VIB element, the optional water, the optional source of the element selected from P, B and Si, the optional source of the group VIIA element and the optional sulphur source can be formed and the support or preferably the matrix can be impregnated.

The support is first formed and calcined. Forming can be by extrusion, pelletization, by the oil drop method, by rotating plate granulation or by using any other method which is known to the skilled person. The pre-formed support is then optionally calcined in air, normally at a temperature of at least 300° C., usually at about 350° C. to 1000° C.

When the support is to be impregnated, the support is preferably impregnated using a dry impregnating process which is known to the skilled person. Impregnation can be carried out in a single step using a solution containing all of the constituent elements of the final catalyst.

The supported catalyst of the invention can be formed by extrusion, pelletization, the oil-drop method, rotating plate granulation or any other method which is known to the skilled person.

The mixed sulphide, also the group VIII element, also the element selected from the group formed by P, B and Si and the element selected from group VIIA of halogens, preferably fluorine, can be introduced into the catalyst at various stages in the preparation and in various manners.

The mixed sulphide phase can be introduced only in part (for example, when at least one group VB metal and/or group VIB metal is combined with at least one group VIII metal) or completely on mixing the porous support.

The group VIII metal, also the element selected from the group formed by P, B, and Si and the element selected from the halogens of group VIIA can be introduced using one or more ion exchange operations carried out on the calcined matrix constituted by the mixed sulphide dispersed in the selected matrix, using a solution containing at least one precursor salt of the group VIII metal. It can be introduced by at least one operation for impregnating the formed and calcined support, using a solution of a precursor of at least one group VIII metal (in particular cobalt and/or nickel), any group VIII metal precursor preferably being introduced at the same time or after any group VB and VIB metal precursor.

When the metals are introduced in a number of impregnation steps using the corresponding precursor salts, an intermediate drying step for the catalyst is generally carried out at a temperature which is generally in the range 60° C. to 250° C.

The sources of group VB elements which can be used are known to the skilled person. Examples of niobium sources are oxides such as $NbO$, $Nb_2O_2$, $Nb_2O_3$, diniobium pentoxide $Nb_2O_5$, niobic acid $Nb_2O_5 \cdot H_2O$, niobium hydroxides and polyoxoniobates, niobium alkoxides with formula $Nb(OR_1)_3$ where $R_1$ is an alkyl radical, niobium oxalate $NbO(HC_2O_4)_5$, ammonium niobate, niobium salts such as niobium fluoride, niobium potassium fluoride, niobium chloride, niobium bromide, niobium iodide, niobium oxyfluoride, niobium oxychloride, niobium oxybromide, niobium oxyiodide, niobium phosphate (NbOPO$_4$), niobium hydride, niobium nitride, niobium oxynitride, niobium boride, niobium carbide, niobium oxycarbide, niobium phosphide, niobium sulphide, carbonyl complexes of niobium, niobium oxynitrates, cyclopentadienyl complexes of niobium, thioniobates, and niobium carboxylates. Niobium oxalate or ammonium niobate are preferably used.

Sources of the group VIB element which can be used are well known to the skilled person. Examples of molybdenum sources are molybdenum oxides and hydroxides, molybdic acid, molybdophosphoric acid, molybdosilicic acid, molybdenum acetylacetonate, molybdenum xanthate, ammonium molybdate, ammonium heptamolybdate, molybdenum salts such as molybdenum fluoride, molybdenum chloride, molybdenum bromide, molybdenum iodide, molybdenum oxyfluoride, molybdenum oxychloride, molybdenum oxybromide, molybdenum oxyiodide, molybdenum hydride, molybdenum nitride, molybdenum oxynitride, molybdenum boride, molybdenum carbide, molybdenum oxycarbide, molybdenum phosphide, molybdenum sulphide, hexacarbonyl molybdenum, thiomolybdates, molybdenum thiophosphates, molybdenum xanthates and thioxanthates, molybdenum dithiophosphates, dithiocarbamates and dithiophosphinates, and molybdenum carboxylates. Molybdenum oxide, ammonium molybdate or ammonium heptamolybdate are preferred.

The sulphur source can be elemental sulphur, carbon disulphide, hydrogen sulphide, sulphur-containing hydrocarbons such as dimethyl sulphide, dimethyldisulphide, mercaptans, thiophene compounds, thiols, polysulphides such as ditertiononylpolysulphide or TPS-37 from ATOCHEM, petroleum cuts which are rich in sulphur such as gasoline, kerosene, or gas oil, used alone or mixed with one of the sulphur-containing compounds cited above. The preferred sulphur source is carbon sulphide or hydrogen sulphide.

The preferred phosphorous source is phosphoric acid H$_3$PO$_4$, but salts and esters such as alkaline phosphates, ammonium phosphates, gallium phosphates or alkyl phosphates are also suitable. Phosphorous can, for example, be introduced in the form of a mixture of phosphoric acid and a basic organic compound containing nitrogen such as ammonia, primary and secondary amines, cyclic amines, compounds of the pyridine family and quinolines and compounds from the pyrrole family.

A number of silicon sources can be used. Thus the following can be used: a hydrogel, an aerogel or a colloidal suspension, precipitation oxides, oxides from ester hydrolysis, such as ethyl orthosilicate Si(OEt)$_4$, siloxanes, amorphous silicates, of aluminium or phosphorous for example, mesoporous silicates, crystallised silicates such as alkaline silicates and alkaline-earth silicates, transition metal silicates such as cobalt or nickel silicates or silicates or halides such as ammonium fluorosilicate (NH$_4$)$_2$SiF$_6$ or sodium fluorosilicate Na$_2$SiF$_6$. Silicon can be added, for example, by impregnating with ethyl silicate in solution in an alcohol.

The boron source can be an amorphous borate, such as ammonium biborate or pentaborate, aluminium borate, phosphorous borate or crystallised borates such as borosilicates. Boron can be introduced, for example, by a solution of boric acid in an alcohol.

Sources of group VIIA elements which can be used are known to the skilled person. As an example, fluoride ions can be introduced in the form of hydrofluoric acid or its salts. These salts are of alkaline metals, ammonium salts or salts of an organic compound. In the latter case, the salt is advantageously formed in the reaction mixture by reaction between the organic compound and hydrofluoric acid. Hydrolysable compounds which can liberate fluoride ions in the water can also be used, such as ammonium fluorosilicate (NH$_4$)$_2$SiF$_6$, silicon tetrafluoride SiF$_4$ or sodium fluorosilicate Na$_2$SiF$_6$. Fluorine can be introduced, for example, by impregnating with an aqueous solution of hydrofluoric acid or ammonium fluoride. The chloride anions can be introduced in the form of hydrochloric acid, or its salts. These salts are formed with alkaline metals, ammonium or an organic compound. In the latter case, the salt is advantageously formed in the reaction mixture by reaction between the organic compound and the hydrochloric acid.

The catalyst of the present invention may contain a group VIII element such as iron, cobalt, nickel, ruthenium, rhodium, palladium, osmium, iridium or platinum. Preferred group VIII metals are metals selected from the group formed by iron, cobalt, nickel and ruthenium. Combinations of the following metals are advantageously used: nickel-niobium-molybdenum, cobalt-niobium-molybdenum, iron-niobium-molybdenum, nickel-niobium-tungsten, cobalt-niobium-tungsten, and iron-niobium-tungsten. Preferred combinations are nickel-niobium-molybdenum and cobalt-niobium-molybdenum. Combinations of four metals can also be used, for example nickel-cobalt-niobium-molybdenum. Combinations containing a noble metal can also be used, such as ruthenium-niobium-molybdenum or ruthenium-nickel-niobium-molybdenum.

When the support comprises at least one matrix, the porous mineral matrix, which is normally amorphous or of low crystallinity, is generally constituted by at least one refractory oxide in an amorphous or low crystallinity form. The matrix is normally selected from the group formed by alumina, silica, silica-alumina, magnesia, titanium oxide or zirconium oxide, or a mixture of at lest two of the oxides cited above. Aluminates can also be selected. Matrices containing alumina are preferred, in all of the forms known to the skilled person, for example gamma alumina. Mixtures of alumina and silica and mixtures of alumina and boron oxide can also be used.

Impregnation of molybdenum can be facilitated by adding phosphoric acid to solutions of ammonium paramolybdate, which thus also introduces phosphorous and promotes catalytic activity. Other phosphorous compounds can be used, as is well known to the skilled person.

Catalysts used for hydrorefining and/or hydrocracking combine a high surface area matrix (100 to 800 m$^2$.g$^{-1}$ in general) with a low to high superficial acidity with a hydrogenating function provided by at least one metal from group VIB of the periodic table such as chromium, molybdenum or tungsten and/or at least one group VIII metal such as iron, cobalt, nickel, ruthenium, rhodium, palladium, osmium, iridium or platinum. The catalysts can also optionally contain at least one element selected from the group (P, Si, B, F).

The catalysts obtained by the present invention are used for hydrorefining hydrocarbon feeds comprising reactions such as hydrogenation, hydrodenitrogenation, hydrodeoxygenation, hydrodearomatisation, and hydrodesulphuration. They can also be used for hydrocracking hydrocarbon feeds.

The feeds used in the process are generally selected from the group formed by gasolines, gas oils, vacuum gas oils, residues which may or may not be deasphalted, paraffin oils, waxes and paraffins, and they generally comprise aromatic compounds and/or olefinic compounds and/or naphthenic compounds and/or paraffinic compounds. They may contain heteroatoms such as sulphur, oxygen and nitrogen and at least one metal. Hydrorefining conditions such as temperature, pressure, hydrogen recycle rate, hourly space velocity, can be highly variable depending on the nature of the feed, the quality of the desired products and the installations available to the refiner. They are well known to the skilled person.

The temperature is generally over 200° C., often in the range 280° C. to 480° C. The pressure is over 0.1 MPa, normally over 5 MPa. The presence of hydrogen is generally necessary with a hydrogen recycle rate of generally at least 80 and normally in the range 200 to 4000 liters of hydrogen per liter of feed. The hourly space velocity is generally in the range 0.1 to 20 h$^{-1}$.

The results which are of interest to the refiner are the HDS, HDN and conversion activities. Specific targets must be achieved under conditions which are compatible with economic reality. Thus the refiner will seek to reduce the temperature, pressure and hydrogen recycle rate and maximise the hourly space velocity. It is known that the activity can be increased by increasing the temperature, but this is often to the detriment of catalyst stability. Stability or service life improves with an increase in pressure or hydrogen recycle rate, but this is to the detriment of process economy.

The following examples illustrate the present invention without in any way limiting its scope.

the same formed support. We used a commercially available gel SB3 sold by Condéa. This gel was mixed with water and nitric acid then mixed for 15 minutes. Following mixing, he paste obtained was passed through a cylindrical die to obtain extrudates with a diameter of 1.4 mm. The extrudates was dried overnight at 120° C. then calcined at 550° C. for 2 hours in moist air containing 7.5% by volume of water. 1.2 mm diameter cylindrical alumina extrudates were obtained.

EXAMPLE 2

Supported NiMo catalyst (comparative)

We added molybdenum to the extruded matrix of Example 1 by dry impregnation with an aqueous medium. The molybdenum salt was ammonium heptamolybdate $Mo_7O_{24}(NH_4)_6.4H_2O$. After dry impregnation, the extrudates were dried overnight at 120° C. then calcined at 350° C. for 2 hours in moist air containing 7.5% by volume of water. We then added nickel to the support impregnated with molybdenum by dry impregnating with an aqueous nickel nitrate medium $Ni(NO_3)_2.6H_2O$. After dry impregnation, the extrudates were dried overnight at 120° C. then calcined at 500° C. for 2 hours in moist air containing 7.5% by volume of water. The final molybdenum trioxide content was 14.0% by weight, which corresponded to 0.097 moles of elemental

TABLE OF SYNTHESISED CATALYSTS OF THE EXAMPLES

| Catalyst | Catalyst composition | Calcined or dried | Example type |
|---|---|---|---|
| A0 | NiMo/alumina standard | calcined | comparative |
| A1 | 14% Mo/alumina | dried | comparative |
| B1 | 13% Nb/alumina | dried | comparative |
| B2 | 4% Nb/alumina | dried | comparative |
| C1 | 7.5% Ni/alumina | dried | comparative |
| C2 | 2.3% Ni/alumina | dried | comparative |
| D1 | (Nb + Mo)alumina, r = 0.2 | dried | in accordance with invention |
| D2 | (Nb + Mo)/alumina, r = 0.3 | dried | in accordance with invention |
| D3 | (Nb + Mo)/alumina, r = 0.4 | dried | in accordance with invention |
| D4 | (Nb + Mo)/alumina, r = 0.5 | dried | in accordance with invention |
| D5 | (Nb + Mo)/alumina, r = 0.7 | dried | in accordance with invention |
| D6 | (Nb + Mo)/alumina, r = 0.9 | dried | in accordance with invention |
| E | ((Nb + Mo) + Ni)/alumina = D2 + Ni | dried | in accordance with invention |
| F1 | Mo + Nb + Ni/alumina | calcined | comparative |
| F2 | Nb + Mo + Ni/alumina | calcined | comparative |
| G1 | $Nb_{0.4}Mo_{0.6}S_2$ massive | dried | in accordance with invention |
| G2 | $NbS_2$ massive | dried | comparative |
| G3 | $MoS_2$ massive | dried | comparative |
| H1 | $Nb_{0.4}Mo_{0.6}S_2$ exf. oxide | dried | in accordance with invention |
| I1 | $Nb_{0.2}W_{0.8}S_2$ massive | dried | in accordance with invention |
| I2 | $WS_2$ massive | dried | comparative |
| J1 | $Ta_{0.4}Mo_{0.6}S_2$ massive | dried | in accordance with invention |
| J2 | $TaS_2$ massive | dried | comparative |
| K1 | $V_{2.39}Mo_{0.61}S_{3.89}$ | dried | in accordance with invention |
| K2 | $V_3S_4$ | dried | comparative |
| L1 | $V_{0.59}Cr_{2.41}S_{3.86}$ | dried | in accordance with invention |
| L2 | $Cr_3S_4$ | dried | comparative |
| M1 | $Nb_{0.35}Mo_{0.55}Ni_{0.1}S_2$ = G1 + Ni | dried | in accordance with invention |
| N1 | G1 + Ru | dried | in accordance with invention |
| O1 | G1 + Li | dried | in accordance with invention |

EXAMPLE 1

Preparation of an alumina support forming part of the composition of the catalysts of the invention We produced a large quantity of an alumina based support so that the catalysts described below could be prepared from molybdenum per 100 g of finished catalyst. The final nickel content was 2.5% by weight which corresponded to 0.034 moles of elemental nickel per 100 g of finished catalyst. Catalyst A0 obtained was representative of industrial catalysts.

EXAMPLE 3

Supported Mo catalyst (comparative)

We added molybdenum to the extruded matrix of Example 1 by dry impregnation with an aqueous medium. The molybdenum salt was ammonium heptamolybdate $Mo_7O_{24}(NH_4)_6 \cdot 4H_2O$. After dry impregnation, the extrudates were dried overnight at 80° C. The final molybdenum trioxide content was 13.8% by weight, which corresponded to 0.096 moles of elemental molybdenum per 100 g of finished catalyst. Catalyst A1 obtained was termed "high molybdenum content"; the molybdenum content was of the same order as that of industrial catalysts.

EXAMPLE 4

Supported Nb catalyst (comparative)

We added niobium to the extruded matrix of Example 1 by dry impregnation with a niobium pentoxide $Nb(OEt)_5$ solution in ethanol. After dry impregnation, the extrudates were dried overnight at 80° C. A first catalyst B1 was prepared with a final diniobium pentoxide content of 13.1% by weight, which corresponded to 0.099 moles of elemental niobium per 100 g of finished catalyst. A second catalyst B2 was prepared with a low final diniobium pentoxide content of 4.3% by weight which corresponded to 0.032 moles of elemental niobium per 100 g of finished catalyst.

EXAMPLE 5

Supported Ni catalysts (comparative)

We produced a first nickel type catalyst deposited on alumina with a high nickel content, i.e., close to that of the molybdenum type catalyst, deposited on alumina described in Example A1. Nickel was added to the extruded matrix of Example 1 by dry impregnation with an aqueous medium using nickel nitrate $Ni(NO_3)_2 \cdot 6H_2O$ as the precursor. After dry impregnation, the extrudates were dried overnight at 80° C. Catlyst C1 obtained had a final nickel content of 7.5% by weight which corresponded by 0.096 moles of elemental nickel per 100 g of finished catalyst.

We produced a second catalyst with a low nickel content. The final nickel content was 2.27% by weight which corresponded by 0.031 moles of elemental nickel per 100 g of finished catalyst. Catalyst C2 obtained was termed "low nickel content"; the nickel content was of the same order of magnitude as that of industrial catalysts.

EXAMPLE 6

Supported mixed niobium and molybdenum (Nb+Mo) sulphide catalysts (in accordance with the invention)

A series of catalyst precursors containing a mixed sulphide phase of niobium and molybdenum with an atomic proportion of niobium r=Nb/(Nb+Mo) of between 0 and 1 was prepared. The two metals were introduced by dry impregnation of the alumina support of Example 1 using ammonium heptamolybdate $Mo_7O_{24}(NH_4)_6 \cdot 4H_2O$ and niobium oxalate $(Nb(HC_2O_4)_5$ as precursors. After each dry impregnation step, the extrudates were dried overnight at 80° C. The final niobium+molybdenum content deposited on the alumina of Example 1 was 0.100 moles per 100 g of finished catalyst. The different catalysts obtained and their oxide contents by weight are shown in Table 4 below.

TABLE 4

Oxide contents of catalysts containing niobium and molybdenum

| Catalyst ref | r = Nb (Nb + Mo) | $MoO_3$ (wt %) | $Nb_2O_5$ (wt %) |
|---|---|---|---|
| D1 | 0.2 | 11.5 | 2.66 |
| D2 | 0.3 | 10.1 | 3.98 |
| D3 | 0.4 | 8.64 | 5.32 |
| D4 | 0.5 | 7.2 | 6.65 |
| D5 | 0.7 | 4.32 | 9.31 |
| D6 | 0.9 | 1.44 | 11.9 |

EXAMPLE 7

Supported [Nb+Mo]+Ni catalyst (in accordance with the invention)

We took a portion of catalyst D2 the production of which has just been described and we added nickel by dry impregnation with an aqueous medium using $Ni(NO_3)_2 \cdot 6H_2O$ as a precursor. After dry impregnation, the extrudates were dried overnight at 80° C. A catalyst E was obtained which contained final molybdenum trioxide, diniobium pentoxide and nickel oxide contents of 10.2%, 3.8% and 21.5% by weight respectively, which corresponded to 0.070, 0.029 and 0.029 moles respectively of the elements molybdenum, niobium and nickel per 100 g of finished catalyst.

EXAMPLE 8

Supported Mo+Nb+Ni catalyst (not in accordance with the invention; cf U.S. Pat. No. 5,275,994)

The catalysts containing molybdenum and niobium of Example 6 and that containing molybdenum, niobium and nickel of Example 7 were not calcined after impregnation with the elements, in order to obtain a sulphur-containing phase. Niobium oxide supported on alumina obtained by calcining a sample of niobium on dried alumina in air at a temperature of more than 200° C. as described in Example 4 is known to be very difficult to sulphurate. Niobium supported on calcined alumina remains difficult to sulphurate, even in the presence of molybdenum and/or nickel. By way of comparison, a catalyst containing molybdenum, niobium and nickel supported on alumina and calcined at a temperature of over 200° C. was thus prepared.

Catalyst F1 was prepared by successive dry impregnation of molybdenum then niobium then nickel. Catalyst F2 was prepared by successive dry impregnation of niobium then molybdenum then nickel. Between each impregnation step, the extrudates were dried overnight at 120° C. then calcined at 500° C. for 2 hours in moist air containing 7.5% by volume of water. The impregnation steps used were identical to those described for catalysts A1, B2 and C2. The final molybdenum trioxide, diniobium pentoxide and nickel oxide contents were 10.2%, 4.1% and 2.0% by weight respectively, which corresponded to 0.072, 0.031 and 0.027 moles respectively for the elements molybdenum, niobium and nickel per 100 g of finished catalyst.

EXAMPLE 9

Sulphuration of catalysts using $CS_2$

The catalysts prepared in the above examples were sulphurated in an autoclave under autogenous pressure in the presence of $CS_2$. 20 ml of $CS_2$ per 100 g of catalyst was added to the autoclave, the autoclave was sealed and heated to 400° C., for 10 hours. The internal pressure was about 4 MPa. This sulphuration step was termed S1.

EXAMPLE 10

Sulphuration of catalysts using $H_2S$

The catalysts prepared in the above examples were sulphurated in a fixed bed reactor flushed with a stream of gas containing 15% of $H_2S$ in nitrogen at atmospheric pressure. 2 liters per hour of the mixture was passed over each 5 g of catalyst which was heated to 400° C., for 10 hours. This sulphuration step was termed S2.

EXAMPLE 11

X ray absorption analysis of supported catalysts

EXAFS analysis was carried out at the niobium K edge using synchrotron radiation between 18850 and 19800 eV by measuring the intensity absorbed by a powder sample deposited on an adhesive strip. Interatomic distances could thus be determined. Distances R2 measured by EXAFS for all of the samples which contained niobium and sulphurated using method S1 and method S2 are shown in Table 5.

TABLE 5

| Catalyst sulphurated by method S1 | R2 (Å) | Catalyst sulphurated by method S2 | R2 (Å) |
|---|---|---|---|
| B1-S1 | 3.33 | B1-S2 | 3.33 |
| D1-S1 | 3.20 | D1-S2 | 3.19 |
| D2-S1 | 3.20 | D2-S2 | 3.21 |
| D3-S1 | 3.22 | D3-S2 | 3.22 |
| D4-S1 | 3.27 | D4-S2 | 3.28 |
| D5-S1 | 3.30 | D5-S2 | 3.29 |
| D6-S1 | 3.32 | D6-S2 | 3.32 |
| E-S1 | 3.21 | E-S2 | 3.21 |
| F1-S1 | 3.33 | F1-S2 | 3.32 |
| F2-S1 | 3.33 | F2-S2 | 3.32 |

Whatever the sulphuration method, catalysts containing both niobium and molybdenum (D1 to D6) have a metal-metal distance R2 in the sulphide phase which is larger than the $NbS_2$ phase of the catalyst containing niobium alone (B1). The presence of nickel does not alter this situation (catalyst E). The metal-metal distance R2, larger than that of $NbS_2$, and thus intermediate between the value of $NbS_2$ and $MoS_2$, indicates the presence of a mixed niobium and molybdenum phase in catalysts D1 to D6 and E. If molybdenum and niobium are introduced successively with intermediate calcining (catalysts F1 and F2), the metal-metal distance R2 is identical to that of $NbS_2$ despite the presence of molybdenum, which indicates that no mixed phase of niobium and molybdenum has formed.

EXAMPLE 12

Preparation of mixed sulphide of niobium and molybdenum used in the composition of the catalysts of the invention This preparation used a mixture of powdered niobium oxalate (21.5 g) and ammonium heptamolybdate (10.6 g) which was introduced into an autoclave with 12 ml of $CS_2$. The autoclave was sealed and heated to 400° C. for 10 hours. The internal pressure was about 3.6 MPa.

After the reaction, solid G1 obtained was filtered, washed with distilled water, then dried at 40° C. The X ray diffraction spectrum corresponded to that of Table 1 in the present description. Chemical analysis of solid G1 gave the following formula for the anhydrous form, free of organic compounds: $Nb_{0.38}Mo_{0.62}S_{1.96}$.

In the same way, a sample of niobium sulphide was prepared by adding 53.8 g of niobium oxalate and 12 ml of $CS_2$ to the autoclave. Solid G2 was obtained with composition $NbS_{1.9}$, determined by chemical analysis.

In the same way, a sample of molybdenum sulphide was prepared by adding 17.6 g of ammonium heptamolybdate and 12 ml of $CS_2$ to the autoclave. Solid G3 was obtained which had composition $MoS_{1.9}$, determined by chemical analysis.

EXAMPLE 13

Preparation of mixed niobium and molybdenum sulphide used in the composition of catalysts of the invention In this preparation, a mixture of powdered niobium pentoxide (45.2 g) and molybdenum trioxide (86.4 g) was used which was calcined at 600° C. in air in a bed reactor in a 2 l/h air stream to obtain a mixed oxide of niobium and molybdenum with formula $Nb_2Mo_3O_{10}$. This oxide was then sulphurated in a continuous flux reactor by passing a mixture of hydrogen sulphide in nitrogen (10% $H_2S$ in $N_2$) at 650° C. for 2 hours at atmospheric pressure. Solid H1 was thus obtained.

After the reaction, solid H1 obtained, which was completely crystallised, had an X ray diffraction spectrum which corresponded to that of Table 1 in the present description.

Chemical analysis of solid H1 gave the following formula for the anyhydrous form: $Nb_{0.4}Mo_{0.6}S_{1.8}$.

EXAMPLE 14

Preparation of mixed sulphide of niobium and tungsten used in the composition of catalysts of the invention This preparation used a mixture of powdered niobium oxalate (10.7 g) and ammonium paratungstate $W_{12}O_{40}H_2$ $(NH_4)_6 \cdot 4H_2O$ (19.8 g) which was introduced into an autoclave with 12 ml of $CS_2$. The autoclave was sealed and heated to 400° C., for 10 hours. The internal pressure was about 3.8 MPa.

After the reaction, solid I1 obtained was filtered, washed with distilled water, then dried at 40° C. Chemical analysis of solid I1 gave the following formula for the anhydrous form, free of organic compounds: $Nb_{0.19}W_{0.81}S_{1.93}$.

In the same way, a sample of tungsten sulphide was prepared by adding 24.6 g of ammonium paratungstate and 12 ml of $CS_2$ to the autoclave. Solid I2 was obtained which had composition $WS_{1.88}$, determined by chemical analysis.

EXAMPLE 15

Preparation of mixed sulphide of tantalum and molybdenum used in the composition of catalysts of the invention This preparation used a mixture of powdered tantalum pentoxide (8.8 g) and molybdenum oxide $MoO_3$ (8.6 g) which was introduced into an autoclave with 12 ml of $CS_2$. The autoclave was sealed and heated to 400° C., for 10 hours. The internal pressure was about 3.8 MPa.

After the reaction, solid J1 obtained was filtered, washed with distilled water, then dried at 40° C. Chemical analysis of solid J1 gave the following formula for the anhydrous form, free of organic compounds: $Ta_{0.39}Mo_{0.61}S_{1.83}$.

In the same way, a sample of tantalum sulphide was prepared by adding 22.6 g of tantalum pentoxide and 12 ml of $CS_2$ to the autoclave. Solid J2 was obtained which had composition $TaS_{1.82}$, determined by chemical analysis.

EXAMPLE 16

Preparation of mixed sulphide of vanadium and molybdenum used in the composition of catalysts of the invention This preparation used a mixture of powdered vanadium pentoxide (21.8 g) and molybdenum oxide $MoO_3$ (8.6 g) which was introduced into an autoclave with 24 ml of $CS_2$. The autoclave was sealed and heated to 400° C., for 10 hours. The internal pressure was about 4.2 MPa.

After the reaction, solid K1 obtained was filtered, washed with distilled water, then dried at 40° C. Chemical analysis of solid K1 gave the following formula for the anhydrous form, free of organic compounds: $V_{2.39}Mo_{0.61}S_{3.89}$.

In the same way, a sample of vanadium sulphide was prepared by adding 27.6 g of vanadium pentoxide and 24 ml of $CS_2$ to the autoclave. Solid K2 was obtained which had composition $V_{2.9}S_{3.9}$, determined by chemical analysis.

EXAMPLE 17

Preparation of mixed sulphide of vanadium and chromium used in the composition of the catalysts of the invention This preparation used a mixture of powdered vanadium pentoxide (5.46 g) and chromium oxide $Cr_2O_3$ (18.6 g) which was introduced into an autoclave with 24 ml of $CS_2$. The autoclave was sealed and heated to 400° C., for 10 hours. The internal pressure was about 4.2 MPa.

After the reaction, solid L1 obtained was filtered, washed with distilled water, then dried at 40° C. Chemical analysis of solid L1 gave the following formula for the anhydrous form, free of organic compounds: $V_{0.59}SCr_{2.41}S_{3.86}$.

In the same way, a sample of chromium sulphide was prepared by adding 22.6 g of chromium oxide and 24 ml of $CS_2$ to the autoclave. Solid L2 was obtained which had composition $Cr_{2.9}S_{3.9}$, determined by chemical analysis.

EXAMPLE 18

Preparation of mixed niobium and molybdenum sulphide containing nickel, in accordance with the invention Product G1 described in Example 12 was dry impregnated with a nickel nitrate solution and then dried in air at 80° C. The composition of solid M1 obtained was $Nb_{0.35}Mo_{0.545}Ni_{0.09}S_{1.92}$.

EXAMPLE 19

Preparation of mixed niobium and molybdenum sulphide containing ruthenium, in accordance with the invention Product G1 described in Example 12 was dry impregnated with a ruthenium chloride solution and then dried in air at 80° C. The composition of solid N1 obtained was $Nb_{0.35}Mo_{0.545}Ru_{0.1}S_{1.94}$.

EXAMPLE 20

Preparation of exfoliated mixed niobium and molybdenum sulphide, in accordance with the invention Product G1 described in Example 12 was suspended in a solution of hexane containing butyllithium. 1.9 g of butyllithium was used per 10 g of solid G1. The resulting solid was recovered by filtering and then moistened with water to de-intercalate the lithium. The exfoliated mixed sulphide phase O1 could then be recovered by filtering and drying at 80° C.

EXAMPLE 21

Dibenzothiophene HDS test

The alumina-supported catalysts A1, $B_1$, and D1 to D6 described above sulphurated by method S1 or S2 were compared in a dibenzothiophene hydrodesulphuration test in a traversed fixed bed hydrogen pressurised reactor under the following operating conditions:

| | |
|---|---|
| Total pressure | 3.3 MPa |
| DBT pressure | 485 Pa |
| Hydrogen flow rate | 84 cm³/h |
| Mass of catalyst | 20–50 mg |
| $H_2S$ pressure | 25.3 kPa |
| Temperature | 300° C. |

The catalytic performances are given in Table 6 below. They are expressed as the relative activity with respect to the specific activity in moles of DBT converted per g of catalyst per hour of the catalyst with reference A1.

TABLE 6

Activity of supported catalysts for dibenzothiophene hydrodesulphuration

| Catalyst | Activity relative to A1 |
|---|---|
| A1-S1 | 1 |
| D1-S1 | 3 |
| D2-S1 | 3.4 |
| D4-S1 | 4.7 |
| D5-S1 | 5.3 |
| D6-S1 | 5 |
| B1-S1 | 3.0 |
| A1-S2 | 1.1 |
| D1-S2 | 1.1 |
| D2-S2 | 0.9 |
| D4-S2 | 1.1 |
| D5-S2 | 1.2 |
| D6-S2 | 1.0 |
| B1-S2 | 1.0 |

When sulphurated using method S2, catalysts containing both niobium and molybdenum (D1, D2, D4, D5 and D6) are more active than the catalyst containing molybdenum alone (A1) or niobium alone (B1). If the molybdenum and niobium are introduced simultaneously (D1, D2, D4, D5, D6), the activity is much higher than the sum of the activities of the two elements taken separately (A1+B1). This shows that the formation of a mixed niobium and molybdenum sulphide phase is beneficial to catalyst activity.

Sulphuration using $H_2S$ (method S2) results in higher activity for the catalyst containing only molybdenum (A1). Using this sulphuration method, all of the catalysts containing niobium are less active compared with catalysts sulphurated using method S1.

Massive catalysts G1 to G3, H1, I1 and J2, J1 and J2, K1 and K2, L1 and L2 and M1 described above and sulphurated using method S1 were compared in a dibenzothiophene hydrodesulphuration test in a traversed fixed bed reactor pressurised with hydrogen under the operating conditions indicated above. The catalytic performances are shown in Table 7 below. They are expressed as the relative activity with respect to the specific activity in moles of DBT converted per g of catalyst per hour of catalyst of the catalyst with reference G3, MoS$_2$.

TABLE 7

Activity of massive catalysts for dibenzothiophene hydrodesulphuration

| Catalyst | Activity relative to G3 |
|---|---|
| G1-S1 | 3 |
| G2-S1 | 0.8 |
| G3-S1 | 1 |
| H1-S1 | 3.5 |
| I1-S1 | 2.1 |
| I2-S1 | 0.9 |
| J1-S1 | 1.8 |
| J2-S1 | 0.2 |
| K1-S1 | 2.5 |
| K2-S1 | 0.4 |
| L1-S1 | 1.3 |
| L2-S1 | 0.15 |
| M1-S1 | 7 |
| N1-S1 | 12 |
| O1-S1 | 10 |

It can be seen that mixed sulphides are more active than simple sulphides of the group VB and VIB elements constituted by them. Thus the mixed molybdenum and niobium sulphide G1 is more active than niobium sulphide G2 and molybdenum sulphide G3. The mixed niobium and tungsten sulphide I1 is more active than niobium sulphide G2 and tungsten sulphide I2. The mixed tantalum and molybdenum sulphide J1 is more active than tantalum sulphide J2 and molybdenum sulphide G3. The mixed vanadium and molybdenum sulphide K1 is more active than vanadium sulphide K2 and molybdenum sulphide G3. The mixed vanadium andchromium sulphide L1 is more active than vanadium sulphide K2 and chromium sulphide L2.

It can also be seen that nickel has a promoting effect on dibenzothiophene desulphuration activity in the mixed niobium and molybdenum sulphide phase G1 since catalyst M1, prepared by adding nickel to catalyst G1, is more active than catalyst G1.

Similarly, it can been seen that ruthenium has a promoting effect on dibenzothiophene desulphuration activity in the mixed niobium and molybdenum sulphide phase G1 since catalyst N1, prepared by adding ruthenium to catalyst G1, is more active than catalyst G1.

Finally, the exfoliated mixed niobium and molybdenum phase O1 is more active for dibenzothiophene desulphuration than the mixed niobium and molybdenum phase G1.

EXAMPLE 22

Gas oil HDS test using supported catalysts

The catalyst of the present invention can advantageously be used for hydrodesulphuration of gas oil type cuts to reduce the sulphur content and satisfy sulphur content regulations. The treated hydrocarbon feeds have initial boiling points of at least 80° C., and more advantageously the cut boils between 150° C. and 480° C.

In this hydrotreatment mode, normally termed gas oil hydrodesulphuration, the catalyst of the invention is used at a temperature which is normally 250° C. or more, generally at most 450° C., and usually in the range 280° C. to 430° C. The pressure is generally over 0.2 MPa, preferably over 0.5 MPa. The quantity of hydrogen is a minimum of 80 normal liters of hydrogen per liter of feed and normally in the range 80 to 1000 normal liters of hydrogen per liter of feed. The hourly space velocity is generally in the range 0.1 to 20 h$^{-1}$, preferably in the range 0.5 to 15 h$^{-1}$. Under these conditions, the catalysts of the present invention containing a mixed sulphide phase combining a group VB element and a group VIB element are better than catalysts containing these elements but not as a mixed phase, as will be shown in the example below.

The supported catalysts described above were also compared in a gas oil hydrodesulphuration test, the principal characteristics of which are shown in the following table:

| | |
|---|---|
| Density at 15° C. | 0.856 |
| Refractive index at 20° C. | 1.4564 |
| Viscosity at 50° C. | 3.72 cSt |
| Sulphur | 1.57% by weight |
| Simulated distillation | |
| IP | 153° C. |
| 5% | 222° C. |
| 50% | 315° C. |
| 95% | 415° C. |
| EP | 448° C. |

The gas oil HDS test was carried out under the following operating conditions:

| | |
|---|---|
| Total pressure | 3 MPa |
| Volume of catalyst | 40 cm$^3$ |
| Temperature | 340° C. |
| Hydrogen flow rate | 20 l/h |
| Feed flow rate | 80 cm$^3$/h |

Each catalyst was sulphurised before the test using a gas oil/DMDS mixture at up to 350° C. The catalytic performances of the tested catalysts are shown in Table 8 below. They are expressed as the activity, assuming that that of catalyst C1 is equal to 1 and considering that they are of order 1.5. The relation connecting activity and conversion (%HDS) is as follows:

$$A_{HDS} = \left[\frac{100}{100 - \%HDS}\right]^{0.5} - 1$$

TABLE 8

Catalyst activity for gas oil hydrodesulphuration

| Catalyst | Activity relative to C1 |
|---|---|
| A0 | 100 |
| A1 | 10 |
| B1 | 5 |
| B2 | 1.85 |
| C1 | 1 |
| C2 | 0.32 |
| D2 | 175 |
| E | 230 |
| F1 | 85 |
| F2 | 68 |

With a high metal content, the catalyst containing only molybdenum (A1) is about twice as active as the catalyst containing only niobium (B1) and about 10 times more active than the catalyst containing only nickel (C1). If the metal content is divided by a factor of about three, the activity is also divided by a factor of about three for niobium (B1and B2) and for nickel (C1 and C2). If molybdenum and niobium are introduced simultaneously (D2), the activity is very much higher than the sum of the activities of the two elements taken separately (A1+B2). If nickel (E) is added to catalyst D2 in a second step, the resulting activity is higher than the sum of the activities of the two catalysts taken separately (D2+C2). Finally, it should be noted that if the three elements are introduced one after the other with intermediate drying and calcining between each step (F1 and F2), the resulting activity is higher than the sum or the activities of the catalysts taken separately (A1+B1+C1) but is much lower than the activity of the catalyst in which the three elements are introduced simultaneously and which has only been dried (D2). This shows that calcining catalysts containing the group VB element prevents sulphuration thereof to a level which is sufficient to produce good activity.

EXAMPLE 23

Gas oil aromatic compound hydrogenation tests

The catalyst of the present invention can advantageously be used for hydrogenating the aromatic compounds in a variety of hydrocarbon cuts with low sulphur contents, for example those which have already been hydrodesulphurised. The treated hydrocarbon feeds have initial boiling points of more than 80° C. and less than 580° C. They contain 1 to 2000 ppm by weight of sulphur, preferably 2 to 1500 ppm of S. This type of hydrotreatment is of particular importance in the reduction of the aromatic compounds content in light and heavy gas oil type feeds.

In this hydrotreatment mode, the catalyst of the invention is used at a temperature which is normally 280° C. or more, generally at most 420° C., and usually in the range 300° C. to 400° C. The pressure is generally over 1 MPa, preferably over 3 MPa. The quantity of hydrogen is a minimum of 100 normal liters of hydrogen per liter of feed and normally in the range 200 to 3000 normal liters of hydrogen per liter of feed. The hourly space velocity is generally in the range 0.1 to 10 $h^{-1}$, preferably in the range 0.2 to 5 $h^{-1}$. Under these conditions, the catalysts of the present invention containing a mixed sulphide phase combining a group VB element and a group VIB element are better than catalysts containing these elements but not as a mixed phase, as will be shown in the example below.

The alumina-supported NiMo and NiMoNb type catalysts A0, E, F1 and F2 were compared in a gas oil aromatic compound hydrogenation test. The test feed was a fluid catalytic cracking or LCO gas oil which had been desulphurised so that it only contained a small quantity of sulphur. The principal characteristics of the desulphurised gas oil are given in the following table:

| Density at 20° C. | 0.904 |
| --- | --- |
| Sulphur (ppm) | 109 |
| Nitrogen (ppm) | 132 |
| D86 (° C.) | |
| IP | 166° C. |
| 10% | 210° C. |
| 50% | 266° C. |
| 90% | 343° C. |
| EP | 415° C. |
| Aromatics (% by weight) | |
| Total | 74 |
| Mono | 44 |
| Di | 27 |

-continued

| Tri | 3 |
| --- | --- |
| AC by NMR | 43 |

It should be noted from this table that the desulphurised gas oil contained only 109 ppm of sulphur, a large quantity of nitrogen, 132 ppm, and a very large quantity of aromatic compounds.

The aromatic compound hydrogenation test was carried out in a fixed bed pilot unit operating in upflow mode, i.e., the feed circulated from bottom to top, under the following operating conditions;

| Total pressure: | 9 MPa; |
| --- | --- |
| Volume of catalyst: | 40 $cm^3$: |
| Temperature: | 340° C. |
| Hydrogen flow rate: | 40 l/h; |
| Feed flow rate: | 40 $cm^3$/h |

Each catalyst was sulphurised before the test at 350° C., and at a total pressure of 9 MPa using the gas oil described above to which 2% by weight of dimethyldisulphide (DMDS) had been added.

The catalytic performances of the catalysts tested are shown in Table 9 below.

For each experiment, we measured the density of the liquid effluent at 20° C., the AC content (Aromatic Carbon measured by NMR) of the effluent and the initial content of the feed, $AC_0$. From the AC of the feed and the AC of the effluent, we calculated the aromatic compound version (%HAR) then the hydrogenating activity assuming it was of order 1.

$$A_{HAR} = Ln\left[\frac{100}{100 - \%HAR}\right]$$

We also determined the hydrodesulphuration activity. The activity was calculated by assuming that the reaction was of order 1.5. The relationship between activity and conversion (%HDS) was thus as follows:

$$A_{HDS} = \left[\frac{100}{100 - \%HDS}\right]^{0.5} - 1$$

We also determined the hydrodenitrogenation activity. The activity was calculated by assuming that the reaction was of order 1. The relationship between activity and conversion of the nitrogen-containing product (%HDN) was thus as follows:

$$A_{HDN} = Ln\left[\frac{100}{100 - \%HDN}\right]$$

In Table 9, the activities are shown as the relative activity, assuming that of catalyst A0 to be equal to 1.

TABLE 9

Aromatic compound hydrogenation activity for catalysts for a desulphurised gas oil

| Catalyst | $A_{HDS}$ relative to catalyst A0 | $A_{HDN}$ relative to catalyst A0 | $A_{HAR}$ relative to catalyst A0 |
|---|---|---|---|
| A0 (NiMo/alumina) | 1 | 1 | 1 |
| E (Nb + Mo) + Ni)/alumina | 1.2 | 1.25 | 1.27 |
| F1 (Mo + Nb + Ni)/alumina | 0.96 | 0.97 | 0.95 |
| F2 (Mo + Nb + Ni)/alumina | 0.85 | 0.83 | 0.86 |

The results of Table 9 indicate that catalysts F1 and F2, which are not in accordance with the invention, and which as demonstrated in Example 11 do not contain a mixed sulphide phase combining Mo and Nb, had lower activities (F2) or at best equivalent activities (F1) than those of NiMo/alumina catalyst A0 containing no niobium. In contrast, the activity of catalyst E, containing a mixed sulphide phase combining Mo and Nb as demonstrated in Example 11, was higher for the three reactions HDS, HDN and hydrogenation than catalyst A0 and catalysts F1 and F2 with compositions which are very close. This better activity probably originates from a modification to the reactivity of the sulphide phase of the molybdenum sulphide when niobium is introduced into its structure. This example also shows that catalysts containing the group VB element must not be calcined.

Catalyst E containing molybdenum and niobium in a mixed sulphide phase with a well defined structure and containing nickel is thus of particular importance for use in hydrotreatment processes for distillate type feeds which have been desulphurised to a sulphur content of less than 700 ppm with the aim of reducing the sulphur content, or reducing the nitrogen content, or of reducing the aromatic compounds content.

EXAMPLE 24

Vacuum distillate hydrotreatment test

The catalyst of the present invention can advantageously be used for hydrotreating vacuum distillate type feeds with high sulphur and nitrogen contents to reduce the sulphur content and in particular to reduce the nitrogen content. The treated hydrocarbon feeds have initial boiling points of at least 250° C., preferably at least 300° C., and more advantageously the cut boils between 330° C. and 650° C. This type of hydrotreatment is of particular importance for pretreating feeds for a hydrocracker using one or more zeolitic catalysts, feeds for a fluid catalytic cracker, and for hydrorefining oil cuts.

In this hydrotreatment mode, sometimes known as pretreatment of hydrocracking feeds, pretreatment of FCC feeds or oil hydrorefining, the catalyst of the invention is used at a temperature which is generally 300° C. or more, generally at most 450° C., and usually in the range 340° C. to 440° C. The pressure is generally over 2 MPa, preferably over 5 MPa. The quantity of hydrogen is a minimum of 100 normal litres of hydrogen per litre of feed and normally in the range 200 to 3000 normal litres of hydrogen per litre of feed. The hourly space velocity is generally in the range of 0.1 to 5 $h^{-1}$, preferably in the range 0.2 to 4 $h^{-1}$. Under these conditions, the catalysts of the present invention containing a mixed sulphide phase combining a group VB element and a group VIB element are better than catalysts containing these elements but not as a mixed phase, as will be shown in the example below.

Alumina-supported NiMo and NiMoNb type catalysts A0, E, F1 and F2 described above were compared in a hydrotreatment test for a vacuum distillate, the principal characteristics of which are given in the following table:

| Density at 15° C.: | 0.938 |
|---|---|
| Sulphur: | 3.12% by weight |
| Total nitrogen: | 1050 ppm by weight |
| Simulated distillation | |
| IP: | 345° C. |
| 10%: | 412° C. |
| 50%: | 488° C. |
| 90%: | 564° C. |
| EP: | 615° C. |

The test was carried out in an isothermal traversed fixed bed pilot reactor, with the fluids circulating from bottom to top. After sulphurising in situ at 350° C. in a pressurised unit using a straight run gas oil to which 2% by weight of dimethylsulphide had been added, the hydrotreatment test was carried out under the following operating conditions:

| Total pressure | 12 MPa; |
|---|---|
| Volume of catalyst | 40 $cm^3$; |
| Temperature | 380° C. |
| Hydrogen flow rate | 24 l/h; |
| Feed flow rate | 20 $cm^3$/h |

The catalytic performances of the tested catalysts are shown in Table 10 below. They are expressed as the relative activity, assuming that that of catalyst A0 is equal to 1 and assuming that they are of order 1.5. The relationship connecting activity and hydrodesulphuration conversion (%HDS) is as follows:

$$A_{HDS} = \left[\frac{100}{100 - \% HDS}\right]^{0.5} - 1$$

The same relationship is applicable to hydrodenitrogenation (%HDN and $A_{HDN}$).

Further, the net conversion of the fraction of the feed having a boiling point of more than 380° C.(%380° C.$^+$ by weight) obtained with each catalyst was evaluated. It is expressed from the simulated distillation results (ASTM method D86) by the relationship:

$$\text{Conv} 380° C.^+ = \frac{(\% 380° C.^+)\text{test} - (\% 380° C.^+)\text{feed}}{(\% 380° C._+)\text{feed}}$$

TABLE 10

Vacuum distillate hydrotreatment activity of NiMo catalysts

| Catalyst | $A_{DDS}$ relative to A0 | $A_{HDN}$ relative to A0 | Conv 380° C.$^+$ (%) |
|---|---|---|---|
| A (NiMo/alumina) | 1 | 1 | 30 |
| E (Nb + Mo) + Ni)/alumina | 1.3 | 1.36 | 38 |
| F1 (Mo + Nb + Ni)/alumina | 0.95 | 1.05 | 32 |
| F2 (Mo + Nb + Ni)/alumina | 0.95 | 0.96 | 31 |

The results in Table 10 indicate that catalysts F1 and F2, not in accordance with the invention, and which as demonstrated in Example 11 do not contain a mixed sulphide phase combining Mo and Nb, have lower activities (F2) than or at best equivalent activities (F1) to those of catalyst A0 NiMo/alumina which does not contain niobium.

Catalyst E containing a mixed sulphide phase combining Mo and Nb, as demonstrated in Example 11 and obtained using the process of the invention, has better performances for hydrodesulphuration, hydrodenitrogenation and conversion of the 380° C.+ fraction to a light cut boiling at a temperature of less than 380° C. than catalyst A0 and catalysts F1 and F2 with very similar compositions. This better activity probably originates from a modification to the reactivity of the sulphide phase of the molybdenum sulphide when niobium is introduced into its structure.

Catalyst E containing molybdenum and niobium in a mixed sulphide phase with a well defined structure and containing nickel is thus of particular importance for use in hydrotreatment processes aimed at pre-treating vacuum distillate type hydrocracking feeds since the improved hydrodenitrogenation activity can produce a hydrocracking feed with a lower nitrogen content.

Catalyst E containing molybdenum and niobium in a mixed sulphide phase with a well defined structure and containing nickel is thus of particular importance for use in hydrotreatment processes aimed at pre-treating vacuum distillate type catalytic cracking feeds since the improved hydrodesulphuration, hydrodenitrogenation and conversion activity can produce a more reactive catalytic cracking feed.

Catalyst E containing molybdenum and niobium in a mixed sulphide phase with a well defined structure and containing nickel is also of particular importance for use in hydrorefining processes since the improved hydrodesulphuration, hydrodenitrogenation and conversion activity means that technical or medicinal oils can be produced to specifications.

EXAMPLE 25

Partial hydrocracking tests on a vacuum distillate

The catalyst of the present invention can advantageously be used for partial hydrocracking of a variety of hydrocarbon cuts, for example vacuum distillate type feeds which contain a large amount of sulphur and nitrogen. The treated hydrocarbon feeds have initial boiling points of at least 150° C., preferably at least 300° C., and more advantageously the cut boils between 330° C. and 650° C.

In this hydrocracking mode, sometimes known as mild hydrocracking, the degree of conversion is less than 55%. The catalyst of the invention is thus used at a temperature which is generally 350° C. or more, generally at most 480° C., and usually in the range of 360° C. to 460° C., preferably 360–450° C. The pressure is generally over 2 MPa, preferably over 5 MPa. The quantity of hydrogen is a minimum of 100 normal litres of hydrogen per litre of feed and normally in the range 200 to 3000 normal litres of hydrogen per litre of feed. The hourly space velocity is generally in the range 0.1 to 5 $h^{-1}$, preferably in the range 0.1 to 4 $h^{-1}$. Under these conditions, the catalysts of the present invention containing a mixed sulphide phase combining a group VB element and a group VIB element are better than catalysts containing these elements but not as a mixed phase, as will be shown in the example below.

Alumina-supported NiMo and NiMoNb type catalysts A0, E, F1 and F2 described above were used in a mild hydrocracking test on a vacuum distillate type petroleum feed containing a large amount of sulphur and nitrogen, the principal characteristics of which are as follows:

| | |
|---|---|
| Density at 15° C. | 0.921 |
| Sulphur | 2.46% by weight |
| Total nitrogen | 1130 ppm by weight |
| Simulated distillation | |
| IP | 365° C. |
| 10% | 430° C. |
| 50% | 472° C. |
| 90% | 504° C. |
| EP | 539° C. |

The catalytic test unit comprised a fixed bed reactor in upflow mode. The partial hydrocracking test was carried out under the following operating conditions:

| | |
|---|---|
| Total pressure | 5 MPa; |
| Volume of catalyst | 40 $cm^3$; |
| Temperature | 380° C. to 420° C. |
| Hydrogen flow rate | 10 l/h; |
| Feed flow rate | 20 $cm^3$/h |

Each catalyst was sulpherised before the test at 350° C., and at a total pressure of 5 MPa using the gas oil described in Example 23 to which 2% by weight of dimethyldisulphide (DMDS) had been added.

Catalytic performances are expressed as the crude conversion at 400° C. (CC), the crude middle distillate selectivity (CS) and by hydrodesulphuration (HDS) and hydrodenitrogenation (HDN) conversions. These catalytic performances were measured on the catalyst after a period of stabilisation had passed, generally at least 48 hours.

The crude conversion CC is taken to be:

CC=% by weight of 380° $C.^{minus}$ in effluent

The crude selectivity of CS for middle distillates is taken to be:

CS=100×weight of (150° C.–380° C.) fraction/weight of 380° $C.^{minus}$ fraction of effluent The hydrodesulphuration conversion HDS is taken to be:

HDS=$(S_{initial}-S_{effluent})/S_{initial}×100=(24600-S_{effluent})/24600×100$

The hydrodenitrogenation conversion HDN is taken to be:

HDS=$(N_{initial}-N_{effluent})/N_{initial}×100=(1130-N_{effluent})/1130×100$

In Table 11 below, we show the crude conversion CC at 400° C., the crude selectivity CS, the hydrodesulphuration conversion HDS and the hydrodenitrogenation conversion HDN for catalysts tested under these conditions.

TABLE 11

Catalyst activity for mild hydrocracking of a vacuum distillate

| | CC (wt %) | CS (%) | HDS (%) | HDN (%) |
|---|---|---|---|---|
| A0 (NiMo/alumina) | 38.2 | 82.6 | 97.6 | 90.3 |
| E (Nb + Mo) + Ni)/alumina | 42.1 | 82.2 | 98.7 | 93.3 |
| F1 (Mo + Nb + Ni)/alumina | 38.3 | 82.4 | 97.3 | 91.2 |
| F2 (Mo + Nb + Ni)/alumina | 37.8 | 82.8 | 96.5 | 89.3 |

The results of Table 11 indicate that catalysts F1 and F2, which are not in accordance with the invention, and which as demonstrated in Example 11 do not contain a mixed sulphide phase combining Mo and Nb, had lower activities (F2) or at best equivalent activities (F1) than those of NiMo/alumina catalyst A0 containing no niobium. In contrast, the activity of catalyst E containing a mixed sulphide phase combining Mo and Nb as shown in Example 11, was higher for the three reactions HDS, HDN and conversion of the 380° C. plus fraction to 380° C. minus, which is difficult to carry out on this type of high sulphur content feed, the catalyst A0 and catalysts F1 and F2 with compositions which are very close. Table 11 also shows that the crude selectivity remained equivalent. This better activity probably originates from a modification to the reactivity of the sulphide phase of the molybdenum sulphide when niobium is introduced into its structure.

Catalyst E containing molybdenum and niobium in a mixed sulphide phase with a well defined structure and containing nickel is thus of particular importance for use in hydrotreatment processes converting vacuum distillate type feeds with a high sulphur and nitrogen content, the process generally being known as mild or partial hydrocracking, at a moderate hydrogen pressure.

EXAMPLE 26

High conversion vacuum distillate hydrocracking tests

The catalyst of the present invention can advantageously be used for hydrocracking a variety of hydrocarbon cuts, for example vacuum distillate type feeds which contain a large amount of sulphur and nitrogen. The treated hydrocarbon feeds have initial boiling points of at least 150° C., preferably at least 300° C., and more advantageously the cut boils between 330° C. and 650° C.

In this hydrotreatment mode, the degree of conversion is over 55%. The operating conditions are generally a temperature of 350–460° C., preferably 360–450° C., a pressure of over 5 MPa, preferably over 8 MPa, and hourly space velocity which is generally in the range 0.1 to 5 $h^{-1}$, preferably in the range 0.1 to 4 $h^{-1}$, and a quantity of hydrogen which is at least 100 Nl/l of feed, preferably 200–3000 Nl/l of feed. Under these conditions, the catalysts of the present invention containing a mixed sulphide phase combining a group VB element and a group VIB element are better than catalysts containing these elements but not as a mixed phase as will be shown in the example below.

Alumina-supported NiMo and NiMoNb type catalysts A0, E, F1 and F2 described above were used under high conversion hydrocracking conditions (60–100%) on a vacuum distillate type petroleum feed containing a large amount of sulphur and nitrogen, the principal characteristics of which are given in the following table:

| | |
|---|---|
| Density at 15° C. | 0.912 |
| Sulphur | 2.22% |
| Total nitrogen | 598 ppm by weight |
| Simulated distillation | |
| IP | 345° C. |
| 10% | 375° C. |
| 50% | 402° C. |
| 90% | 428° C. |
| EP | 467° C. |

The catalytic test unit comprised a fixed bed reactor in upflow mode. The hydrocracking test was carried out under the following operating conditions:

| | |
|---|---|
| Total pressure | 20 MPa; |
| Volume of catalyst | 40 $cm^3$; |
| Temperature | 380° C. to 420° C. |
| Hydrogen flow rate | 24 l/h; |
| Feed flow rate | 20 $cm^3$/h |

Each catalyst was sulphurised before the test at 350° C., and at a total pressure of 20 MPa using the feed to which 2% by weight of dimethyldisulphide (DMDS) had been added.

Under these conditions, catalytic performances for hydrodesulphuration (HDS) and hydrodenitrogenation (HDN) were such that the sulphur contents (S<10 ppm) and nitrogen contents (N<2 ppm) in the effluent were below the limit of detection of standard analysis techniques. This observation is normal bearing in mind the high hydrogen pressure employed. Of greatest interest is the conversion activity of the 380° $C.^{plus}$ fraction, i.e., the crude conversion (CC). The catalytic performances were measured on the catalyst after a period of stabilisation had passed, generally at least 48 hours.

The crude conversion CC is taken to be:
CC=% by weight of 380° $C.^{minus}$ in effluent Table 12 below shows the crude conversion CC at 410° C. for catalysts tested under these conditions.

TABLE 12

Catalyst activity for high pressure hydrocracking of a vacuum distillate

| | CC (wt %) |
|---|---|
| A0 (NiMo/alumina) | 65.2 |
| E (Nb + Mo) + Ni)/alumina | 73.4 |
| F1 (Mo + Nb + Ni) /alumina | 65.2 |
| F2 (Mo + Nb + Ni)/alumina | 63.3 |

The results of Table 12 indicate that catalysts F1 and F2, which are not in accordance with the invention, and which as demonstrated in Example 11 do not contain a mixed sulphide phase combining Mo and Nb, had lower activities (F2) or at best equivalent activities (F1) than those of NiMo/alumina catalyst A0 containing no niobium. In contrast, the activity of catalyst E, containing a mixed sulphide phase combining Mo and Nb as demonstrated in Example 11, was higher for converting the 380° C. plus fraction to 380° C. minus, which is difficult to carry out with this type of high sulphur feed, than catalyst A0 and catalysts F1 and F2 with compositions which are very close. This better activity probably originates from a modification to the reactivity of the sulphide phase of the molybdenum sulphide when niobium is introduced into its structure.

Catalyst E containing molybdenum and niobium in a mixed sulphide phase with a well defined structure and containing nickel is thus of particular importance for use in processes for hydrocracking vacuum distillate feeds with a high sulphur and nitrogen content, the process generally being known as hydrocracking using an amorphous catalyst, at a high hydrogen pressure.

EXAMPLE 27

Gasoline hydrodesulphuration tests

The catalyst of the present invention can advantageously be used for hydrodesulphuration of gasoline type cuts to reduce the sulphur content and satisfy sulphur content regulations in gasolines. The treated hydrocarbon feeds have initial boiling points of at least 25° C., preferably at least 30° C., and more advantageously the cut boils between 30° C. and 280° C.

In this hydrotreatment mode, often known as gasoline hydrodesulphuration, pretreatment of a catalytic reforming feed or hydrodesulphuration of gasoline from a fluid catalytic cracker, the catalyst of the invention is used at a temperature which is generally 200° C. or more, generally at most 400° C. The pressure is over 0.1 MPa, preferably over 0.2 MPa. The quantity of hydrogen is a minimum of 80 normal litres of hydrogen per litre of feed and usually in the range 80 to 1000 normal litres of hydrogen per litre of feed. The hourly space velocity is generally in the range 1 to 20 $h^{-1}$, preferably in the range 2 to 2 $h^{-1}$. Under these conditions, the catalysts of the present invention containing a mixed sulphide phase combining a group VB element and a group VIB element are better than catalysts containing these elements but not as a mixed phase, as will be shown in the example below.

Alumina-supported NiMo and NiMoNb type catalysts A0, E, F1 and F2 described above were compared in an FCC gasoline hydrodesulphuration test carried out in a traversed fixed bed pilot unit operating in upflow mode, i.e., the feed circulated from bottom to top. The principal characteristics of the feed are given in the following table:

| | |
|---|---|
| Density at 22° C. | 0.735 |
| Sulphur | 230 ppm |
| S mercaptans | 69 ppm |
| Olefins (GC) | 26.8% by weight |
| Diolefins (GC) | 1.15% by weight |
| Bromine number (g/100 g) | 47 |
| Simulated distillation | |
| IP | 53° C. |
| EP | 168° C. |

The gasoline HDS test was carried out under the following operating conditions:

| | |
|---|---|
| Total pressure | 6 MPa; |
| Volume of catalyst | 25 cm³; |
| Temperature | 250° C. |
| Hydrogen flow rate | 60 Nl/h; |
| Feed flow rate | 200 cm³/h |

Each catalyst was sulphurised for 4 hours at 350° C. before the test, and at a total pressure of 6 MPa using a mixture containing 2% by weight of dimethyldisulphide (DMDS) in n-heptane with a HSV of 1 $h^{-1}$ and a hydrogen flow rate of 360 Nl per litre of feed.

The catalytic performances of the tested catalysts are shown in Table 13 below. Performance is indicated by the amount of sulphur removed.

TABLE 13

Gasoline hydrodesulphuration activity of catalyts

| Catalyst | % S removed |
|---|---|
| A0 (NiMo/alumina) | 87.2 |
| E (Nb + Mo) + Ni)/alumina | 88.3 |

TABLE 13-continued

Gasoline hydrodesulphuration activity of catalyts

| Catalyst | % S removed |
|---|---|
| F1 (Mo + Nb + Ni)/alumina | 90.9 |
| F2 (Mo + Nb + Ni)/alumina | 89.5 |

The results of Table 13 indicate that catalysts F1 and F2, which are not in accordance with the invention, and which as demonstrated in Example 11 do not contain a mixed sulphide phase combining Mo and Nb, had lower (F2) or at best equivalent hydrodesulphuration activities (F1) than those of NiMo/alumina catalyst A0 containing no niobium. In contrast, the hydrodesulphuration activity of catalyst E, containing a mixed sulphide phase combining Mo and Nb as demonstrated in Example 11, was higher for hydrodesulphuration than catalyst A0 and catalysts F1 and F2 with compositions which are very close. This better activity probably originates from the modification of the reactivity of the sulphide phase of the molybdenum sulphide when niobium is introduced into its structure.

Catalyst E containing molybdenum and niobium in a mixed sulphide phase with a well defined structure and containing nickel is thus of particular importance for use in gasoline hydrodesulphuration processes.

The preceding examples can be repeated with similar success by substituting the generically or specifically described reactants and/or operating conditions of this invention for those used in the preceding examples.

The entire disclosure of all applications, patents and publications, cited above and below, and of corresponding French application Nos. 96/16.091 and 97/02.595, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A catalyst comprising at least one crystalline mixed single phase sulphide of the following approximate general formula:

$A_xB_{1-x}S_y$ where:
x is a number in the range 0.001 to 0.999;
y is a number in the range 0.1 to 8;
A is a group VB element;
B is an element selected from group VIB.

2. A catalyst according to claim 1, in which the group VB element is niobium.

3. A catalyst according to claim 1, in which the group VIB element is molybdenum or tungsten.

4. A catalyst according to claim 1, in which the group VIB element is molybdenum.

5. A catalyst according to claim 1, comprising a mixed niobium and molybdenum sulphide.

6. A catalyst according to claim 1, wherein said mixed sulphide has the following approximate general formula:

$A_xB_{1-x}S_y$ where:
x is a number in the range 0.05 to 0.95;
y is a number in the range 0.5 to 4;
A is a group VB element;
B is an element selected from group VIB.

7. A catalyst according to claim 1, comprising at least one element from group VIII of the periodic table.

8. A catalyst according to claim 7, in which the group VIII metal is selected from the group consisting of iron, cobalt and nickel.

9. A catalyst according to claim 1, further comprising a support.

10. A catalyst according to claim 9, in which said support is a matrix.

11. A catalyst according to claim 10, in which said matrix is alumina.

12. A catalyst according to claim 1, in which said mixed sulphide has been intercalated with lithium then de-intercalated.

13. A catalyst according to claim 1, comprising at least one element selected from the group consisting of phosphorous, boron and silicon.

14. A catalyst according to claim 1, further comprising at least one group VIIA element.

15. A catalyst according to claim 14, in which said element is fluorine.

16. A catalyst according to claim 1, which includes, in % by weight with respect to the total catalyst mass:
0.01% to 100% of at least one mixed sulphide;
the catalyst optionally further containing:
0 to 99.99% of at least one group VIII metal;
0 to 20% of at least one element selected from the group consisting of elements Si, P and B; and
0 to 15% of at least one element selected from the group VIIA.

17. A catalyst according to claim 1, which is supported and which includes, in % by weight with respect to the total catalyst mass:
0.5% to 99.5% of at least one mixed sulphide;
0.5% to 99.5% of at least one support;
the catalyst optionally further containing:
0 to 30% of at least one group VIII metal;
0 to 20% of at least one element selected from the group consisting of the elements Si, P and B; and
0 to 15% of at least one element selected from group VIIA.

18. A catalyst according to claim 1, which is supported and which includes, in % by weight with respect to the total catalyst mass:
1% to 99.9% of at least one matrix;
0.1% to 99% of at least one mixed sulphide of a group VB element and a group VIB element;
the catalyst optionally further containing:
0 to 30% of at least one group VIII metal;
0 to 20% of at least one element selected from the group consisting of the elements Si, P and B; and
0 to 15% of at least one element selected from group VIIA.

19. A process for the preparation of a mixed sulphide comprised in a catalyst according to claim 1, the process comprising the following steps:
a) forming a reaction mixture which comprises at least the following compounds: at least one source of a group VB element, at least one source of a group VIB element optionally water, optionally at least one element selected from the group elements, optionally at least one source of an element selected from the group consisting of the elements: P, B and Si, and optionally at least one element group VIIA elements;
b) maintaining the mixture at a heating temperature which is over about 40° C., at a pressure which is at least equal to atmospheric pressure and in the presence of a sulphur compound until the mixed sulphide is obtained.

20. A process according to claim 19, in which the mixture is sulphurated at a temperature which is in the range 40° C. to 700° C., under autogenous pressure and in the presence of a gaseous sulphur compound.

21. A process according to claim 20 in which said gaseous sulphur compound is $CS_2$.

22. A process according to claim 19 for the synthesis of a mixed sulphide in which the group VB element is niobium and the group VIB element is molybdenum, comprising subjecting $Nb_2Mo_3O_{14}$ to sulphuration.

23. A process according to claim 22, in which sulphuration is carried out in a stream of a hydrogen/hydrogen sulphide or nitrogen/hydrogen sulphide mixture at a temperature which is in the range 150° C. to 800° C., in a traversed bed reaction zone.

24. A process for preparing a supported mixed sulphide comprised in a catalyst according to claim 19, which further comprises providing the mixed sulphide with a support.

25. A process according to claim 19, further comprising mixing the mixed sulphide with a support.

26. A process for the preparation of a supported mixed sulphide comprised in a catalyst according to claim 1, which comprises the following steps
a) forming a reaction mixture which comprises at least the following substances, at least one matrix support, at least one source of a group VB element, at least one source of a group VIB element, optionally water, optionally at least one group VIII element optionally at least one source of an element selected from the group consisting of the elements: P, B and Si, and optionally at least one source of an element from group VIIA;
b) maintaining the mixture at a sufficient heating temperature for a sufficient time in the presence of a sulphur compound until a solid containing at least the support and the mixed sulphide is obtained.

27. A process according to claim 26, in which step a) is a support impregnation step.

28. A catalyst precursor comprising at least one crystalline single phase mixed sulphide of the following approximate general formula:
$A_xB_{1-x}S_y$
where
x is a number in the range of 0.001 to 0.999;
y is a number in the range of 0.1 to 8;
A is a group VB element;
B is an element selected from group VIB,
said precursor further containing lithium.

29. A catalyst produced in accordance with the process of claim 19.

30. A catalyst produced in accordance with the process of claim 20.

31. A catalyst produced in accordance with the process of claim 21.

32. A catalyst produced in accordance with the process of claim 22.

33. A catalyst produced in accordance with the process of claim 23.

34. A catalyst produced in accordance with the process of claim 26.

35. A catalyst produced in accordance with the process of claim 27.

36. A catalyst according to claim 26, wherein the product of step (a) is not calcined prior to step (b).

37. In a process comprising catalytically hydrorefining or hydrocracking hydrocarbon feeds, at a temperature of more than 200° C., a pressure of more than 0.1 Mpa, in the presence of hydrogen with a recycle ratio of at least 80 litres of hydrogen per litre of feed and at an hourly space velocity which is in the range 0.1 to 20 h$^{-1}$, the improvement wherein the catalyst is in accordance with claim 18.

38. A process according to claim 37, in which the feed is selected from the group consisting of gasolines, gas oils, vacuum gas oils, residues which are optionally be deasphalted, paraffin oils, waxes and paraffins optionally containing heteroatoms sulphur, oxygen or nitrogen and at least one metal.

39. In a process comprising catalytically hydrorefining or hydrocracking hydrocarbon feeds, at a temperature of more than 200° C., a pressure of more than 0.1 MPa, in the presence of hydrogen with a recycle of at least 80 litres of hydrogen per litre of feed and at an hourly space velocity which is in the range 0.1 to 20 h$^{-1}$, the improvement wherein the catalyst is in accordance with claim 18.

* * * * *